United States Patent
Chevallier et al.

(12)

(10) Patent No.: US 6,169,135 B1
(45) Date of Patent: *Jan. 2, 2001

(54) PRECIPITATED SILICA

(75) Inventors: Yvonick Chevallier, Fontaines-Saint-Martin; Evelyne Prat, Pantin, both of (FR)

(73) Assignee: Rhone Poulenc Chimie, Courbevoie (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/808,681

(22) Filed: Feb. 28, 1997

Related U.S. Application Data

(63) Continuation of application No. 08/446,797, filed on Aug. 21, 1995, now abandoned.

(30) Foreign Application Priority Data

Sep. 29, 1993 (FR) .................................. 93 11553
Aug. 12, 1994 (FR) .................................. 94 10046

(51) Int. Cl.$^7$ ...................................... C08K 3/36
(52) U.S. Cl. ........................................ 524/492; 423/335
(58) Field of Search ...................... 423/335, 338, 423/339; 524/492, 493

(56) References Cited

U.S. PATENT DOCUMENTS

| | | | |
|---|---|---|---|
| 2,731,326 | * | 1/1956 | Alexander et al. .................. 423/335 |
| 4,067,746 | * | 1/1978 | Wason et al. ......................... 423/339 |
| 4,699,732 | | 10/1987 | Woodhead . |
| 4,704,374 | | 11/1987 | Jacques . |
| 4,704,425 | | 11/1987 | Lagarde et al. . |
| 4,708,859 | | 11/1987 | Chevallier . |
| 4,738,838 | | 4/1988 | Shinpo et al. . |
| 4,778,667 | | 10/1988 | Garvey et al. . |
| 4,842,838 | | 6/1989 | Chevallier . |
| 4,973,462 | | 11/1990 | Akira et al. . |
| 5,009,874 | | 4/1991 | Parmentier et al. . |
| 5,021,192 | | 6/1991 | David et al. . |
| 5,089,554 | | 2/1992 | Bomo et al. . |
| 5,094,829 | | 3/1992 | Krivak et al. ......................... 423/339 |
| 5,124,143 | | 6/1992 | Mühlemann et al. . |
| 5,132,048 | | 7/1992 | Picard-Seon et al. . |
| 5,231,066 | * | 7/1993 | Peters et al. ......................... 423/339 |
| 5,236,623 | * | 8/1993 | Chevallier ............................ 423/339 |
| 5,342,598 | * | 8/1994 | Persello ................................ 423/339 |
| 5,376,305 | | 12/1994 | Chane-Ching et al. . |
| 5,395,605 | * | 3/1995 | Billion et al. ......................... 423/339 |
| 5,403,570 | * | 4/1995 | Chevallier et al. .................. 423/339 |
| 5,412,018 | | 5/1995 | Krivak et al. ......................... 524/492 |
| 5,418,273 | | 5/1995 | Dromard et al. . |
| 5,484,581 | | 1/1996 | Esch et al. . |
| 5,512,271 | | 4/1996 | McKeown et al. . |
| 5,547,502 | | 8/1996 | Chevallier et al. . |
| 5,587,416 | | 12/1996 | Chevallier et al. . |

FOREIGN PATENT DOCUMENTS

| | | | |
|---|---|---|---|
| 0 396.450 | | 11/1990 | (EP) . |
| 0 407262 | | 1/1991 | (EP) . |
| 520862 | * | 12/1992 | (EP) . |
| 1 054175 | | 2/1954 | (FR) . |
| 1 072520 | | 9/1954 | (FR) . |
| 2353486 | | 12/1977 | (FR) . |
| 2 652.805 | | 4/1991 | (FR) . |

* cited by examiner

*Primary Examiner*—Steven P. Griffin
*Assistant Examiner*—Stuart L. Hendrickson
(74) *Attorney, Agent, or Firm*—Burns, Doane, Swecker & Mathis, L.L.P.

(57) ABSTRACT

Silicas in the form of powder and substantially spherical beads or granules are characterized by a CTAB specific surface of 140 and 240 m$^2$/g a high ultrasonic disaggregation factor, an average diameter, which is small after ultrasonic disaggregation, and optionally, a porous distribution, the porous volume formed by the pores with a diameter of 175 to 275 Å being less than 50% of the porous volume formed by the pores with diameters of 400 Å or less. The silicas may be used as reinforcing fillers for elastomers. The invention also concerns a method for preparing precipitated silica of the type comprising the reaction of an alkaline metal silicate M with an acidifying agent, resulting in a suspension of precipitated silica, and the separation and drying of said suspension, wherein precipitation is performed as follows: (i) an initial seed is formed comprising a portion of the total quantity of alkaline metal silicate M in the reaction, the silicate concentration (expressed as SiO$_2$) in said seed being less than 20 g/l; (ii) an acidifying agent is added to the initial seed until at least 5% of the quantity of M$_2$O in the initial seed is neutralized; (iii) the acidifying agent and the remaining quantity of alkaline metal silicate M are added simultaneously so that the ratio of the quantity of added silicate (expressed as SiO$_2$) to the quantity of silica in the initial seed (expressed as SiO$_2$) is greater than 4 and at most 100.

11 Claims, No Drawings

PRECIPITATED SILICA

This application is a continuation of application Ser. No. 08/446,797, filed Aug. 21, 1995, now abandoned.

The present invention concerns a novel process for the preparation of precipitated silica, in particular precipitated in the form of a powder, substantially spherical spherules, or granules, and their application as a reinforcing filler for elastomers.

FIELD OF THE INVENTION

Precipitated silica has long been used as a white reinforcing filler for elastomers, in particular for tires.

However, like all reinforcing fillers, it must capable of ready manipulation in, and above all incorporation into the mixtures.

BACKGROUND OF THE INVENTION

It is generally known that, in order to produce optimal reinforcing properties from a filler, the latter must be present in the elastomer matrix in a final form which is both as finely divided as possible and distributed as homogeneously as possible. These conditions can only be satisfied if the filler can be extremely easily incorporated into the matrix during mixing with the elastomer (filler incorporability) and can disaggregate or deagglomerate to a very fine powder (filler disaggregation), and if the powder produced by the disaggregation process described can itself disperse perfectly and homogeneously in the elastomer (powder dispersion).

Further, the silica particles have an annoying tendency to agglomerate among themselves in the elastomer matrix because of mutual attraction. These silica/silica interactions limit the reinforcing properties to a level which is far lower than that which could theoretically be achieved if all the silica/elastomer interactions which could be formed during the mixing operation were formed (this theoretical number of silica/elastomer interactions is known to be directly proportional to the external surface area of the silica used).

These silica/silica interactions also tend to increase the rigidity and consistency of the mixtures in the uncured state, making their use more difficult.

It is difficult to find fillers which, while having a relatively large size, readily disperse in elastomers.

SUMMARY OF THE INVENTION

The present invention aims to overcome the drawbacks described above and resolve the difficulty mentioned above.

More precisely, it provides a novel process for the preparation of precipitated silica which advantageously has improved dispersion (and deagglomeration) abilities and/or reinforcing properties, in particular when used as a filler for elastomers, to provide the latter with an excellent compromise between their different mechanical properties.

The invention also concerns precipitated silicas, preferably in the form of a powder, substantially spherical spherules or, optionally, granules and which, while relatively large in size, have highly satisfactory dispersion (and deagglomeration) abilities. They also have improved reinforcing properties.

Finally, the invention concerns the use of said precipitated silicas as reinforcing fillers for elastomers.

One of the objects of the invention is thus to provide a process for the preparation of a precipitated silica comprising reacting an alkali metal M silicate with an acidifying agent to produce a suspension of a precipitated silica, then separating and drying said suspension, characterised in that precipitation is carried out as follows:

(i) forming an initial seed comprising a portion of the total amount of the alkali metal M silicate used i the reaction, the concentration of silicate expressed as $SiO_2$ in said seed being less than 20 g/l, (ii) adding acidifying agent to said initial seed until at least 5% of the quantity of $M_2O$ present in said initial seed is neutralised, (iii) simultaneously adding acidifying agent and the remaining quantity of alkali metal M silicate to the reaction medium such that the ratio of the quantity of silicate added (expressed as $SiO_2$)/quantity of silicate present in the initial seed (expressed as $SiO_2$), the consolidation ratio, is greater than 4 and at most 100.

It has thus been discovered that a very low concentration of silicate expressed in $SiO_2$ in the initial seed and an appropriate consolidation ratio during the simultaneous addition step constitute important conditions for ensuring that the products obtained have excellent properties.

It should be noted that, in general, the process concerned is a process for the synthesis of precipitated silica, ie., an acidifying agent is reacted with an alkali metal M silicate.

The choice of acidifying agent and silicate is made in known fashion. The acidifying agent is usually a strong mineral acid such as sulphuric acid, nitric acid or hydrochloric acid, or an organic acid such as acetic acid, formic acid or a carboxylic acid.

The silicate can be in any known form such as a metasilicate, disilicate or, advantageously, an alkali metal M silicate where M is sodium or potassium.

In general, the acidifying agent used is sulphuric acid, and the silicate used is sodium silicate.

When using sodium silicate, this generally has a $SiO_2/Na_2O$ molar ratio of between 2 and 4, more particularly between 3.0 and 3.7.

Specifically, precipitation is carried out using the following steps of the process of the invention.

Firstly, a seed containing silicate is formed. The quantity of silica present in the initial seed advantageously only represents a portion of the total quantity of silicate used in the reaction.

According to an essential feature of the preparation process of the invention, the concentration of silicate in the initial seed is least than 20 g of $SiO_2$ per liter.

This concentration can be at most 11 g/l, optionally at most 8 g/l.

Particularly when the separation carried out at the end of the process of the invention comprises filtration using a filter press, this concentration is preferably at least 8 g/l, in particular between 10 and 15 g/l, for example between 11 and 15 g/l; the subsequent drying step in the process of the invention is then advantageously carried out by atomisation using a spray diffuser.

The conditions imposed on the silicate concentration in the initial seed partially determine the characteristics of the silicas obtained.

The initial seed may contain an electrolyte. Nevertheless, it is preferable that no electrolyte is used during the preparation process of the invention; in particular, the initial seed preferably contains no electrolyte.

The term "electrolyte" has its normal meaning here, ie., it signifies any ionic or molecular substance which, when in solution, decomposes or dissociates to form ions or charged particles. A salt from the group formed by alkali metal and alkaline-earth metal salts can be cited as an electrolyte, in particular the salt of the starting metal silicate and the acidifying agent, for example sodium sulphate in the case of the reaction of sodium silicate with sulphuric acid.

The second step consists in adding the acidifying agent to the seed with the composition described above.

Thus, in the second step, the acidifying agent is added to said initial seed until at least 5%, preferably at least 50%, of the quantity of $M_2O$ present in said initial seed is neutralised.

Preferably, the acidifying agent is added to said initial seed in said second step until 50% to 99% of the quantity of $M_2O$ present in said initial seed is neutralised.

The acidifying agent can be dilute or concentrated; the concentration can be between 0.4 and 36N, for example between 0.6 and 1.5N.

In particular, when the acidifying agent is sulphuric acid, its concentration is preferably between 40 and 180 g/l, for example between 60 and 130 g/l.

When the desired concentration of neutralised $M_2O$ has been reached, simultaneous addition (step (iii)) of the acidifying agent and a quantity of alkali metal M silicate is commenced so that the consolidation ratio, i.e., the ratio of the quantity of silicate added (expressed as $SiO_2$)/quantity of silicate present in the initial seed (expressed as $SiO_2$) is greater than 4 and at most 100.

In one embodiment of the invention, simultaneous addition of the acidifying agent and quantity of alkali metal M silicate is carried out such that the consolidation ratio is more particularly between 12 and 100, preferably between 12 and 50, most particularly between 13 and 40.

In a further embodiment of the invention, simultaneous addition of the acidifying agent and quantity of alkali metal M silicate is carried out such that the consolidation ratio is greater than 4 and less than 12, preferably between 5 and 11.5, more particularly between 7.5 and 11. This embodiment is generally employed when the silicate concentration in the initial seed is at least 8 g/l, in particular between 10 and 15 g/l, for example between 11 and 15 g/l.

Preferably, the quantity of acidifying agent added during the totality of step (iii) is such that 80% to 99%, for example 85% to 97% of the quantity of $M_2O$ added is neutralised.

In step (iii), it is possible to carry out the simultaneous addition step of the acidifying agent and the silicate at a first reaction medium pH of $pH_1$, then at a second reaction medium pH of $pH_2$, such that $7<pH_2<pH_1<9$.

The acidifying gent used during step (iii) can be diluted or concentrated: the concentration can be between 0.4 and 36 N, for example between 0.6 and 1.5 N.

In particular, when the acidifying agent is sulphuric acid, its concentration is preferably between 40 and 180 g/l, for example between 80 and 130 g/l.

In general, the alkali metal M silicate added during step (iii) has a concentration, expressed as silica, of between 40 and 330 g/l, for example between 60 and 300 g/l, in particular between 60 and 250 g/l.

The precipitation reaction itself is terminated when the remaining quantity of silicate has been added.

It may be advantageous, particularly following the simultaneous addition step, to mature the reaction medium over a period of 1 to 60 minutes, in particular 5 to 30 minutes.

Finally, it is desirable to add a supplemental quantity of acidifying agent to the reaction medium in a subsequent step following precipitation and prior to maturing. This addition step is generally carried out until the reaction medium reaches a pH of between 3 and 6.5 is reached, preferably between 4 and 5.5. It allows all the $M_2O$ added during step (iii) to be neutralised and regulates the final pH of the silica to the desired value for the given application.

The acidifying agent used in this addition step is generally identical to that used during step (iii) of the process of the invention.

The temperature of the reaction medium is normally between 60° C. and 98° C.

Preferably, during step (ii) the acidifying agent is added at a temperature of between 60° C. and 96° C. to the initial seed.

In a further embodiment of the invention, the reaction is carried out at a constant temperature between 70° C. and 90° C. (particularly when the consolidation ratio is greater than 4 and less than 12) or between 75° C. and 96° C. (particularly when the consolidation ratio is between 12 and 100).

In a still further embodiment of the invention, the temperature at the end of the reaction is higher than the temperature at the beginning of the reaction: thus, the starting temperature is preferably maintained between 70° C. and 90° C. (particularly when the consolidation ratio is greater than 4 and less than 12) or between 70° C. and 96° C. (particularly when the consolidation ratio is between 12 and 100), then the temperature is increased over several minutes during the course of the reaction, preferably to between 75° C. and 98° C., for example between 80° C. and 90° C. (particularly when the consolidation ratio is greater than 4 or less than 12) or between 80° C. and 98° C. (particularly when the consolidation ratio is between 12 and 100), and kept at this value until the reaction is finished.

A silica slurry is produced after the operations just described. This is then separated (liquid-solid separation). Separation generally consists of filtration followed by washing if required. If filtration can be carried out using any convenient method (for example using a filter press, band filter or rotary vacuum filter), it is advantageously carried out using a filter press when the silicate concentration in the initial seed is at least 8 g/l (and less than 20 g/l), in particular between 10 and 15 g/l, for example between 11 and 15 g/l.

The recovered suspension of precipitated silica (filtration cake) is then dried.

Drying can be carried out using any known means.

Drying is preferably effected by atomisation.

Any suitable atomiser can be used, in particular centrifugal driers, spray diffusers, pressurised liquid sprays or double fluid sprays.

Drying is advantageously effected by atomisation using a spray diffuser when the silicate concentration in the initial seed is at least 8 g/l (and less than 20 g/l), in particular between 10 and 15 g/l, for example between 11 and 15 g/l.

The precipitated silica which can be obtained under these conditions of silicate concentration using a filter press and a spray diffuser is normally in the form of substantially spherical spherules, preferably with an average size of at least 80 $\mu$m.

In a still further embodiment of the process of the invention, the suspension to be dried has a dry matter content of more than 15% by weight, preferably greater than 17% by weight, for example greater than 20% by weight. Drying is preferably carried out using a spray diffuser.

The precipitated silica which can be obtained using this embodiment is normally in the form of substantially spherical spherules, preferably with an average size of at least 80 $\mu$m.

This dry matter content can be produced by direct filtration using a suitable filter (in particular a filter press) to give a filter cake with the correct content. An alternative method consists in adding dry material, for example powdered silica, to the cake in a final step of the process, following filtration, to produce the required content.

It should be noted that it is well known that the cake obtained is generally not in an atomisable condition principally because the viscosity is too high.

The cake is then disintegrated using known techniques. This operation can be carried out by passing the cake through a colloidal or ball mill. In addition, the viscosity of the suspension to be atomised can be reduced by adding aluminium, in particular in the form of sodium aluminate, during the process, as described in French patent application FR-A-2 536 380, whose subject matter is hereby incorporated. The addition can in particular be made at the disintegration stage.

A milling step can follow the drying step, particularly when the recovered product has been obtained by drying a suspension with a dry matter content of more than 15% by weight. The precipitated silica which can then be obtained is generally in the form of a powder, preferably with an average size of at least 15 $\mu$m, in particular between 15 and 60 $\mu$m, for example between 20 and 45 $\mu$m.

Once they have been milled to the desired granulometry, the products can be separated from any products which do not conform to the average, for example using vibrating sieves of suitable mesh size, and the non conforming products which are recovered can be returned to the milling step.

In a further embodiment of the process of the invention, the suspension to be dried has a dry matter content of less than 15% by weight. Drying is generally carried out in a centrifugal drier. The precipitated silica which can then be obtained is generally in the form of a powder, preferably with an average size of at least 15 $\mu$m, in particular between 30 and 150 $\mu$m, for example between 45 and 120 $\mu$m.

Disintegration can also be carried out.

Finally, the dried product (particularly from a suspension with a dry matter content of less than 15% by weight) or milled product can be submitted to an agglomeration step in a still further embodiment of the process of the invention.

The term "agglomeration" means any process which binds together finely divided objects to form larger, mechanically resistant objects.

Particular processes are direct compression, wet granulation (ie., using a binder such as water, silica slurry, . . . ), extrusion and, preferably, dry compaction.

When using the latter technique, it can be of advantage to deaerate (also known as predensification or degassing) the powdered products before compaction to eliminate the air included in the products and ensure more regular compaction.

The precipitated silica which can be obtained from this embodiment of the invention is advantageously in the form of granules, preferably with dimensions of at least 1 mm, in particular between 1 and 10 mm.

Following the agglomeration step, the products can be calibrated to the desired size, for example by sieving, then packaged for future use.

One advantage of the powders and spherules of precipitated silica obtained using the process of the invention is that they can simply, efficiently and economically be formed into granules as described, particularly using conventional forming operations, such as granulation or compaction, and these operations do not cause deterioration which can mask or even destroy the excellent intrinsic reinforcing properties of these powders, as could be the case when using the conventional powders of the prior art.

The invention also relates to novel precipitated silicas having a good dispersion (and deagglomeration) ability and improved reinforcing properties, said silicas preferably being relatively large in size and generally being obtained using one of the embodiments of the process of the invention described above.

In the following description, the BET specific surface area was determined using the BRUNAUER-EMMET-TELLER method described in "The Journal of the American Chemical Society", Vol.60. page 809, February 1938, corresponding to standard NFT 45007 (November 1987).

The CTAB specific surface area is the external surface area determined in accordance with standard NFT 45007 (November 1987) (5.12).

The DOP oil absorption value was determined in accordance with standard NFT 30-022 (March 1953) using dioctylphthalate.

The loose packing density (LPD) was measured in accordance with standard NFT-030100.

Finally, the pore volumes given were measured by mercury porosimetry. The pore diameters were calculated using the WASHBURN relation with an angle of contact theta of 130° and a surface tension gamma of 484 dynes/cm (MICROMERITICS 9300 porosimeter).

The dispersibility and deagglomeration ability of the silicas of the invention was quantified using a specific deagglomeration test.

The deagglomeration test was carried out as follows:

agglomerate cohesion was measured by granulometric measurement (using a diffraction laser), carried out on a silica suspension which had been deagglomerated using ultrasound; the deagglomeration ability of the silica (breakdown of objects from 0.1 to several dozen microns) was thus measured. Ultrasound deagglomeration was effected using a VIBRACELL BIOBLOCK (600 W) sonificator equipped with a 19 mm diameter probe. Granulometric measurements were carried out using a diffraction laser on a SYMPATEC granulometer.

2 grams of silica were measured into a small beaker (height: 6 cm and diameter: 4 cm) and brought up to 50 grams by addition of deionised water: an aqueous suspension containing 4% of silica was thus formed which was homogenized for 2 minutes using a magnetic stirrer. Ultrasound deagglomeration was then carried out as follows: the probe was immersed to a depth of 4 cm and the output power was regulated to produce a 20% needle deviation on the power dial (corresponding to an energy dissipation of 120 watt/cm$^2$ at the probe tip). Deagglomeration was carried out for 420 seconds. Granulometric measurement was then carried out after introducing a known volume (in ml) of the homogenised suspension into the granulometer cell.

The medial diameter $\phi_{50}$ obtained was lower the greater the deagglomeration ability of the silica. The ratio (10× volume of suspension introduced in ml)/optical density of the suspension measured by granulometry, where the optical density is of the order of 20, was also measured. This ratio indicated the fines content, ie., the ratio of particles of less than 0.1 $\mu$m which are not detected by the granulometer. This ratio, termed the ultrasound deagglomeration factor ($F_D$) is higher when the silica has a higher deagglomeration ability.

A first embodiment of the invention provides a novel precipitated silica characterised in that it has the following properties:

a CTAB specific surface area ($S_{CTAB}$) of between 140 and 240 m$^2$/g, preferably between 140 and 225 m$^2$/g, for example between 150 and 225 m$^2$/g, in particular between 150 and 200 m$^2$/g, an ultrasound deagglomeration factor ($F_D$) of more than 11 ml, for example more than 12.5 ml, a medial diameter ($\varnothing_{50}$), following ultrasound deagglomeration, of less than 2.5 μm, in particular less than 2.4 μm, for example less than 2.0 μm.

A second embodiment of the invention provides a novel precipitated silica characterised in that it has the following properties:

- a CTAB specific surface area ($S_{CTAB}$) of between 140 and 240 m²/g, preferably between 140 and 225 m²/g, for example between 150 and 225 m²/g,
- a pore distribution such that the pore volume constituted by pores with diameters of between 175 and 275 Å represents less than 50% of the pore volume constituted by pores with diameters of less than or equal to 400 Å,
- an ultrasound deagglomeration factor ($F_D$) of more than 5.5 ml,
- a medial diameter ($\varnothing_{50}$), following ultrasound deagglomeration, of less than 5 μm.

One feature of a silica in accordance with the second embodiment of the invention is its pore volume distribution, in particular the pore volume distribution constituted by pores with diameters of less than or equal to 400 Å. This latter volume corresponds to the useful pore volume of fillers which are used to reinforce elastomers. Porogram analysis shows that silicas in accordance with the second embodiment of the invention have less than 50%, preferably less than 40% of their useful pore volume constituted by pores with diameters in the range 175 to 275 Å.

Preferably, silicas in accordance with the second embodiment of the invention have the following properties:

- an ultrasound deagglomeration factor ($F_D$) of more than 11 ml, for example more than 12.5 ml, and/or
- a medial diameter ($\varnothing_{50}$), following ultrasound deagglomeration, of less than 4 μm, for example less than 2.5 μm.

The silicas of the invention generally have a BET specific surface area ($S_{BET}$) of between 140 and 300 m²/g, in particular between 140 and 280 m²/g, for example between 150 and 270 m²/g.

In a further embodiment of the invention, the silicas have a $S_{BET}/S_{CTAB}$ ratio of between 1.0 and 1.2, ie., the silicas have a low microporosity.

In a still further embodiment of the invention, the silicas have a $S_{BET}/S_{CTAB}$ ratio of more than 1.2, for example between 1.21 and 1.4, ie., the silicas have a relatively high microporosity.

The silicas of the invention generally have a DOP oil absorption value of between 150 and 400 ml/100 g, more particularly between 180 and 350 ml/100 g, for example between 200 and 310 ml/100 g.

The silicas of the invention can be in the form of a powder, substantially spherical spherules or optionally granules, and are particularly characterised in that, while of relatively large size, they have remarkable deagglomeration ability and dispersibility and highly satisfactory reinforcing properties. They thus advantageously have a superior deagglomeration ability and dispersibility and a specific surface area and size which is identical to or close to those of prior art silicas.

Silica powders in accordance with the invention preferably have an average size of at least 15 μm, for example between 20 and 120 μm or between 15 and 60 μm (in particular between 20 and 45 μm) or between 30 and 150 μm (in particular between 45 and 120 μm).

The loose packaging density (LPD) of said powders is generally at least 0.17, for example between 0.2 and 0.3.

Said powders generally have a total pore volume of at least 2.5 cm³/g, more particularly between 3 and 5 cm³/g.

This produces a very good compromise between use and final mechanical properties in the vulcanised state.

Finally, they constitute particularly suitable precursors for the synthesis of granules as will be described below.

The substantially spherical spherules of the invention preferably have an average size of at least 80 μm.

In certain embodiments of the invention, this average spherule size is at least 100 μm, for example at least 150 μm; it is generally at most 300 μm and is preferably between 100 and 270 μm. The average size is determined in accordance with standard NFx11507 (December 1970) by dry sieving and determination of the diameter corresponding to an accumulated residue of 50%.

The loose packaging density (LPD) of said spherules is generally at least 0.17, for example between 0.2 and 0.34.

They generally have a total pore volume of at least 2.5 cm³/g, in particular between 3 and 6 cm³/g.

As indicated above, a silica in the form of substantially spherical spherules, which are advantageously solid, homogeneous, of low pulverulence and with good flow characteristics, has a very good deagglomeration ability and dispersibility. It also has excellent reinforcing properties. This form of silica also constitutes a highly suitable precursor for the synthesis of powders and granules in accordance with the invention.

The dimensions of the granules of the invention are preferably at least 1 mm, in particular between 1 and 10 mm, measured along the axis of their largest dimension (length).

Said granules can be in a variety of forms. Examples are spheres, cylinders, parallelepipeds, pellets, platelets or circular section or multilobed extrudates.

The loose packing density (LPD) of said granules is generally at least 0.27, up to 0.37.

They generally have a total pore volume of at least 1 cm³/g, more particularly between 1.5 and 2 cm³/g.

The silicas of the invention, in particular in the form of a powder, substantially spherical spherules or granules, are preferably prepared using a suitable embodiment of the process of the invention described above.

Silicas in accordance with the invention or prepared using the process of the invention have particular application in reinforcing natural or synthetic elastomers, in particular tires.

They provide the elastomers with an excellent compromise between their different mechanical properties, in particular a significant improvement in rupture or tear resistance and, in general, good abrasion resistance. In addition, these elastomers preferably heat up to a lesser extent.

The following examples illustrate the invention without in any way limiting its scope.

EXAMPLE 1

662 liters of a solution of sodium silicate ($SiO_2/Na_2O$ molar ratio of 3.4) with a concentration expressed as silica of 7.1 g/l were introduced into a stainless steel reactor equipped with a propeller stirrer and double envelope heater.

The concentration of silicate expressed as $SiO_2$ in the initial seed was thus 7.1 g/l. The temperature of the solution was raised to 85° C. with stirring. The entire reaction was carried out at 85° C. A solution of sulphuric acid was then introduced at a concentration of 80 g/l and a rate of 7.3 l/mn for a period of 3 min 20 s; following addition, the neutralisation ratio in the seed was 85%, ie., 85% of the quantity of $Na_2O$ present in the initial seed had been neutralised.

The following were then introduced simultaneously into the reaction medium over 70 min:

a solution of sulphuric acid with a concentration of 80 g/l, at a rate of 7.3 l/min, and a solution of sodium silicate, with a concentration expressed as silica of 130 g/l, at a rate of 10.1 l/min.

During this simultaneous addition step, the instantaneous neutralisation ratio was 92%, ie., 92% of the quantity of $Na_2O$ added (per min) was neutralised.

The consolidation ratio following simultaneous addition was 19.6.

Following introduction of all the silicate, sulphuric acid introduction was continued at the same rate for 10 min. This complementary addition of acid brought the pH of the reaction medium to a value of 4.5.

A slurry of precipitated silica was thus obtained which was filtered and washed using a rotary vacuum filter to recover a silica cake with a loss on ignition of 87% (and thus a dry matter content of 13% by weight).

This cake was then fluidised by simple mechanical action. After this disintegration operation, the resulting slurry was atomised using a centrifugal drier. The characteristics of silica P1 in powder form (in accordance with the invention) were as follows:

| | |
|---|---|
| CTAB specific surface area | 159 m$^2$/g |
| BET specific surface area | 195 m$^2$/g |
| pore volume V1 represented by pores with d ≦ 400 Å | 0.94 cm$^3$/g |
| pore volume V2 represented by pores 175 Å ≦ d ≦ 275 Å | 0.41 cm$^3$/g |
| ratio V2/V1 | 44% |
| average particle size | 60 μm |

The deagglomeration test described above was then carried out on silica P1.

Following ultrasound deagglomeration, the silica had a medial diameter ($\phi_{50}$) of 1.2 μm and an ultrasound deagglomeration factor ($F_D$) of 12 ml.

EXAMPLE 2

662 liters of a solution of sodium silicate ($SiO_2/Na_2O$ molar ratio of 3.4) with a concentration expressed as silica of 51 g/l were introduced into a stainless steel reactor equipped with a propeller stirrer and double envelope heater.

The concentration of silicate expressed as $SiO_2$ in the initial seed was thus 5 g/l. The temperature of the solution was raised to 85° C. with stirring. The entire reaction was carried out at 85° C. A solution of sulphuric acid was then introduced at a concentration of 80 g/l and a rate of 5.1 l/mn for a period of 3 min 20 s; following addition, the neutralisation ratio in the seed was 85%, ie., 85% of the quantity of $Na_2O$ present in the initial seed had been neutralised.

The following were then introduced simultaneously into the reaction medium over 70 min:

a solution of sulphuric acid with a concentration of 80 g/l, at a rate of 5.1 l/min, and a solution of sodium silicate, with a concentration expressed as silica of 130 g/l, at a rate of 7.1 l/min.

During this simultaneous addition step, the instantaneous neutralisation ratio was 92%, ie., 92% of the quantity of $Na_2O$ added (per min) was neutralised.

The consolidation ratio following simultaneous addition was 19.5.

Following introduction of all the silicate, sulphuric acid introduction was continued at the same rate for 10 min. This complementary addition of acid brought the pH of the reaction medium to a value of 4.5.

A slurry of precipitated silica was thus obtained which was filtered and washed using a rotary vacuum filter to recover a silica cake with a loss on ignition of 87% (and thus a dry matter content of 13% by weight).

This cake was then fluidised by simple mechanical action. After this disintegration operation, the resulting slurry was atomised using a centrifugal drier.

The characteristics of silica P2 in powder form (in accordance with the invention) were as follows:

| | |
|---|---|
| CTAB specific surface area | 182 m$^2$/g |
| BET specific surface area | 225 m$^2$/g |
| pore volume V1 represented by pores with d ≦ 400 Å | 0.93 cm$^3$/g |
| pore volume V2 represented by pores 175 Å ≦ d ≦ 275 Å | 0.30 cm$^3$/g |
| ratio V2/V1 | 32% |
| average particle size | 60 μm |

The deagglomeration test described above was then carried out on silica P2.

Following ultrasound deagglomeration, the silica had a medial diameter ($\phi_{50}$) of 2.9 μm and an ultrasound deagglomeration factor ($F_D$) of 14 ml.

EXAMPLE 3

The process of Example 2 was followed, except for the simultaneous addition of sulphuric acid and sodium silicate. Thus:

662 liters of a solution of sodium silicate ($SiO_2/Na_2O$ molar ratio of 3.4) with a silica concentration of 5 g/l was introduced into a stainless steel reactor equipped with a propeller stirrer and double envelope heater.

The concentration of silicate expressed as $SiO_2$ in the initial seed was thus 5 g/l. The temperature of the solution was raised to 85° C. with stirring. The entire reaction was carried out at 85° C. A solution of sulphuric acid was then introduced at a concentration of 80 g/l and a rate of 5.1 l/mn for a period of 3 min 20 s; following addition, the neutralisation ratio in the seed was 85%, ie., 85% of the quantity of $Na_2O$ present in the initial seed had been neutralised.

The following were then introduced simultaneously into the reaction medium over 70 min:

a solution of sulphuric acid with a concentration of 80 g/l, at a rate of 5.1 l/min, and a solution of sodium silicate, with a silica concentration expressed as $SiO_2$ of 230 g/l, at a rate of 4.1 l/min.

During this simultaneous addition step, the instantaneous neutralisation ratio was 92%, ie., 92% of the quantity of $Na_2O$ added (per min) was neutralised.

The consolidation ratio following simultaneous addition was 19.9.

Following introduction of all the silicate, sulphuric acid introduction was continued at the same rate for 10 min. This complementary addition of acid brought the pH of the reaction medium to a value of 4.5.

A slurry of precipitated silica was thus obtained which was filtered and washed using a rotary vacuum filter to recover a silica cake with a loss on ignition of 87.1% (and thus a dry matter content of 12.9% by weight).

This cake was then fluidised by simple mechanical action. After this disintegration operation, the resulting slurry was atomised using a centrifugal drier.

The characteristics of silica P3 in powder form (in accordance with the invention) were as follows:

| CTAB specific surface area | 215 m²/g |
|---|---|
| BET specific surface area | 221 m²/g |
| pore volume V1 represented by pores with d ≤ 400 Å | 0.93 cm³/g |
| pore volume V2 represented by pores 175 Å ≤ d ≤ 275 Å | 0.42 cm³/g |
| ratio V2/V1 | 45% |
| average particle size | 60 μm |

The deagglomeration test described above was then carried out on silica P3.

Following ultrasound deagglomeration, the silica had a medial diameter ($\phi_{50}$) of 1.2 μm and an ultrasound deagglomeration factor ($F_D$) of 20 ml.

EXAMPLE 4

662 liters of a solution of sodium silicate ($SiO_2/Na_2O$ molar ratio of 3.4) with a concentration expressed as silica of 3.85 g/l was introduced into a stainless steel reactor equipped with a propeller stirrer and double envelope heater.

The concentration of silicate expressed as $SiO_2$ in the initial seed was thus 3.85 g/l. The temperature of the solution was raised to 85° C. with stirring. The entire reaction was carried out at 85° C. A solution of sulphuric acid was then introduced at a concentration of 80 g/l and a rate of 3.9 l/mn for a period of 3 min 20 s; following addition, the neutralisation ratio in the seed was 85%, ie., 85% of the quantity of $Na_2O$ present in the initial seed had been neutralised.

The following were then introduced simultaneously into the reaction medium over 70 min:

a solution of sulphuric acid with a concentration of 80 g/l, at a rate of 3.9 l/min, and a solution of sodium silicate, with a concentration expressed as silica of 65 g/l, at a rate of 10.9 l/min.

During this simultaneous addition step, the instantaneous neutralisation ratio was 92%, ie., 92% of the quantity of $Na_2O$ added (per min) was neutralised.

The consolidation ratio following simultaneous addition was 19.5.

Following introduction of all the silicate, sulphuric acid introduction was continued at the same rate for 10 min. This complementary addition of acid brought the pH of the reaction medium to a value of 4.5.

A slurry of precipitated silica was thus obtained which was siltered and washed using a rotary vacuum filter to recover a silica cake with a loss on ignition of 87.1% (and thus a dry matter content of 12.9% by weight).

This cake was then fluidised by simple mechanical action. After this disintegration operation, the resulting slurry was atomised using a centrifugal drier.

The characteristics of silica P4 in powder form (in accordance with the invention) were as follows:

| CTAB specific surface area | 210 m²/g |
|---|---|
| BET specific surface area | 244 m²/g |
| pore volume V1 represented by pores with d ≤ 400 Å | 0.89 cm³/g |
| pore volume V2 represented by pores 175 Å ≤ d ≤ 275 Å | 0.20 cm³/g |
| ratio V2/V1 | 22% |
| average particle size | 60 μm |

The deagglomeration test described above was then carried out on silica P4.

Following ultrasound deagglomeration, the silica had a medial diameter ($\phi_{50}$) of 4.1 μm and an ultrasound deagglomeration factor ($F_D$) of 13 ml.

EXAMPLE 5

662 liters of a solution of sodium silicate ($SiO_2/Na_2O$ molar ratio of 3.5) with a concentration expressed as silica of 5 g/l were introduced into a stainless steel reactor equipped with a propeller stirrer and double envelope heater.

The concentration of silicate expressed as $SiO_2$ in the initial seed was thus 5 g/l. The temperature of the solution was raised to 85° C. with stirring. The entire reaction was carried out at 85° C. A solution of sulphuric acid was then introduced at a concentration of 80 g/l and a rate of 5,2 l/mn for a period of 3 min 8 s; following addition, the neutralisation ratio in the seed was 85%, ie., 85% of the quantity of $Na_2O$ present in the initial seed had been neutralised.

The following were then introduced simultaneously into the reaction medium over 70 min:

a solution of sulphuric acid with a concentration of 80 g/l, at a rate of 5.2 l/min, and a solution of sodium silicate, with a concentration expressed as silica of 230 g/l, at a rate of 4.1 l/min.

During this simultaneous addition step, the instantaneous neutralisation ratio was 95%, ie., 95% of the quantity of $Na_2O$ added (per min) was neutralised.

The consolidation ratio following simultaneous addition was 19.9.

Following introduction of all the silicate, sulphuric acid introduction was continued at the same rate for 10 min. This complementary addition of acid brought the pH of the reaction medium to a value of 4.5.

A slurry of precipitated silica was thus obtained which was filtered and washed using a rotary vacuum filter to recover a silica cake with a loss on ignition of 86.4% (and thus a dry matter content of 13.6% by weight).

This cake was then fluidised by simple mechanical action. After this disintegration operation, the resulting slurry was atomised using a centrifugal drier.

The characteristics of silica P5 in powder form (in accordance with the invention) were as follows:

| CTAB specific surface area | 164 m²/g |
|---|---|
| BET specific surface area | 194 m²/g |
| pore volume V1 represented by pores with d ≤ 400 Å | 1.15 cm³/g |
| pore volume V2 represented by pores 175 Å ≤ d ≤ 275 Å | 0.70 cm³/g |
| ratio V2/V1 | 44% |
| average particle size | 65 μm |

The deagglomeration test described above was then carried out on silica P5.

Following ultrasound deagglomeration, the silica had a medial diameter ($\phi_{50}$) of 1.2 μm and an ultrasound deagglomeration factor ($F_D$) of 12 ml.

EXAMPLE 6

662 liters of a solution of sodium silicate ($SiO_2/Na_2O$ molar ratio of 3.5) with a concentration expressed as silica of 5 g/l were introduced into a stainless steel reactor equipped with a propeller stirrer and double envelope heater.

The concentration of silicate expressed as $SiO_2$ in the initial seed was thus 5 g/l. The temperature of the solution was raised to 85° C. with stirring. The entire reaction was carried out at 85° C. A solution of sulphuric acid was then introduced at a concentration of 80 g/l and a rate of 5.2 l/mn for a period of 3 min 9 s; following addition, the neutralisation ratio in the seed was 85%, ie., 85% of the quantity of $Na_2O$ present in the initial seed had been neutralised.

The following were then introduced simultaneously into the reaction medium over 80 min:
- a solution of sulphuric acid with a concentration of 80 g/l, at a rate of 5.2 l/min, and
- a solution of sodium silicate, with a concentration expressed as silica of 230 g/l, at a rate of 4.1 l/min.

During this simultaneous addition step, the instantaneous neutralisation ratio was 95%, ie., 95% of the quantity of $Na_2O$ added (per min) was neutralised.

The consolidation ratio following simultaneous addition was 22.8.

Following introduction of all the silicate, sulphuric acid introduction was continued at the same rate for 10 min. This complementary addition of acid brought the pH of the reaction medium to a value of 4.5.

A slurry of precipitated silica was thus obtained which was filtered and washed using a rotary vacuum filter to recover a silica cake with a loss on ignition of 86.1% (and thus a dry matter content of 13.9% by weight).

This cake was then fluidised by simple mechanical action. After this disintegration operation, the resulting slurry was atomised using a centrifugal drier.

The characteristics of silica P6 in powder form (in accordance with the invention were as follows:

| | |
|---|---|
| CTAB specific surface area | 157 m²/g |
| BET specific surface area | 193 m²/g |
| pore volume V1 represented by pores with d ≦ 400 Å | 0.95 cm³/g |
| pore volume V2 represented by pores 175 Å ≦ d ≦ 275 Å | 0.42 cm³/g |
| ratio V2/V1 | 44% |
| average particle size | 70 μm |

The deagglomeration test described above was then carried out on silica P6.

Following ultrasound deagglomeration, the silica had a medial diameter ($\phi_{50}$) of 1.3 μm and an ultrasound deagglomeration factor ($F_D$) of 10 ml.

EXAMPLE 7

662 liters of a solution of sodium silicate ($SiO_2/Na_2O$ molar ratio of 3.5) with a concentration expressed as silica of 5 g/l were introduced into a stainless steel reactor equipped with a propeller stirrer and double envelope heater.

The concentration of silicate expressed as $SiO_2$ in the initial seed was thus 5 g/l. The temperature of the solution was raised to 85° C. with stirring. The entire reaction was carried out at 85° C. A solution of sulphuric acid was then introduced at a concentration of 80 g/l and a rate of 5.2 l/mn for a period of 3 min 30 s; following addition, the neutralisation ratio in the seed was 95%, ie., 95% of the quantity of $Na_2O$ present in the initial seed had been neutralised.

The following were then introduced simultaneously into the reaction medium over 70 min:
- a solution of sulphuric acid with a concentration of 80 g/l, at a rate of 5.2 l/min, and
- a solution of sodium silicate, with a concentration expressed as silica of 230 g/l, at a rate of 4.1 l/min.

During this simultaneous addition step, the instantaneous neutralisation ratio was 95%, ie., 95% of the quantity of $Na_2O$ added (per min) was neutralised.

The consolidation ratio following simultaneous addition was 19.9.

Following introduction of all the silicate, sulphuric acid introduction was continued at the same rate for 10 min. This complementary addition of acid brought the pH of the reaction medium to a value of 4.5.

A slurry of precipitated silica was thus obtained which was filtered and washed using a rotary vacuum filter to recover a silica cake with a loss on ignition of 86.7% (and thus a dry matter content of 13.3% by weight).

This cake was then fluidised by simple mechanical action. After this disintegration operation, the resulting slurry was atomised using a centrifugal drier.

The characteristics of silica P7 in powder form (in accordance with the invention) were as follows:

| | |
|---|---|
| CTAB specific surface area | 168 m²/g |
| BET specific surface area | 195 m²/g |
| pore volume V1 represented by pores with d ≦ 400 Å | 0.94 cm³/g |
| pore volume V2 represented by pores 175 Å ≦ d ≦ 275 Å | 0.47 cm³/g |
| ratio V2/V1 | 50% |
| average particle size | 65 μm |

The deagglomeration test described above was then carried out on silica P7.

Following ultrasound deagglomeration, the silica had a medial diameter ($\phi_{50}$) of 1.1 μm and an ultrasound deagglomeration factor ($F_D$) of 13 ml.

EXAMPLE 8

The following were introduced into a stainless steel reactor equipped with a propeller stirrer and a double envelope heater:
- 626 liters of water and
- 36 liters of a solution of sodium silicate ($SiO_2/Na_2O$ molar ratio of 3.4) with a concentration expressed as silica of 135 g/l.

The concentration of silicate expressed as $SiO_2$ in the initial seed was thus 7.3 g/l. The temperature of the solution was raised to 85° C. with stirring. The entire reaction was carried out at 85° C. A solution of sulphuric acid was then introduced at a concentration of 80 g/l and a rate of 5.6 l/mn for a period of 3 min 30 s; following addition, the neutralisation ratio in the seed was 67%, ie., 67% of the quantity of $Na_2O$ present in the initial seed had been neutralised.

The following were then introduced simultaneously into the reaction medium over 70 min:
- a solution of sulphuric acid with a concentration of 80 g/l, at a rate of 5.6 l/min, and
- a solution of sodium silicate, with a concentration expressed as silica of 135 g/l, at a rate of 8.6 l/min.

During this simultaneous addition step, the instantaneous neutralisation ratio was 80%, ie., 80% of the quantity of $Na_2O$ added (per min) was neutralised.

The consolidation ratio following simultaneous addition was 16.7.

Following introduction of all the silicate, sulphuric acid introduction was continued at the same rate for 10 min. This complementary addition of acid brought the pH of the reaction medium to a value of 4.5.

The reaction medium was then allowed to mature for 10 min (with stirring at 85° C.).

A slurry of precipitated silica was thus obtained which was diluted with 540 liters of water then filtered and washed using a rotary vacuum filter to recover a silica cake with a loss on ignition of 88.0% (and thus a dry matter content of 12.0% by weight).

This cake was then fluidised by mechanical and chemical action (addition of a quantity of sodium aluminate corresponding to a Al/SiO$_2$ weight ratio of 3000 ppm). After this disintegration operation, a pumpable cake was obtained with a pH of 6.4 which was atomised using a centrifugal drier.

The characteristics of silica P8 in powder form (in accordance with the invention) were as follows:

| | |
|---|---|
| CTAB specific surface area | 149 m$^2$/g |
| BET specific surface area | 200 m$^2$/g |
| pore volume V1 represented by pores with d ≦ 400 Å | 0.92 cm$^3$/g |
| pore volume V2 represented by pores 175 Å ≦ d ≦ 275 Å | 0.50 cm$^3$/g |
| ratio V2/V1 | 54% |
| average particle size | 55 µm |

The deagglomeration test described above was then carried out on silica P8.

Following ultrasound deagglomeration, the silica had a medial diameter ($\phi_{50}$) of 2.3 µm and an ultrasound deagglomeration factor ($F_D$) of 17 ml.

EXAMPLE 9

The following were introduced into a stainless steel reactor equipped with a propeller stirrer and a double envelope heater:
  750 liters of water and
  26.5 liters of a solution of sodium silicate (SiO$_2$/Na$_2$O molar ratio of 3.5) with a concentration expressed as silica of 235 g/l.

The concentration of silicate expressed as SiO$_2$ in the initial seed was thus 8 g/l. The temperature of the solution was raised to 85° C. with stirring. The entire reaction was carried out at 85° C. A solution of dilute sulphuric acid with a density of 1.050 at 20° C. was then introduced at a rate of 6.0 l/mn for a period of 5 min 35 s; following addition, the neutralisation ratio in the seed was 95%, ie., 95% of the quantity of Na$_2$O present in the initial seed had been neutralised.

Simultaneous introduction of a sodium silicate solution of the type description above at a rate of 4.8 l/min and of dilute sulphuric acid also of the type described above and at a rate which was regulated so as to maintain a pH of 8.5±0.1 in the reaction medium, was then effected over 75 min.

During this simultaneous addition step, the instantaneous neutralisation ratio was 90%, ie., 90% of the quantity of Na$_2$O added (per min) was neutralised.

The consolidation ratio following simultaneous addition was 13.5.

Following simultaneous addition, silicate introduction was halted and dilute sulphuric acid introduction was continued at for 14 min to reduce the pH of the reaction medium to a value of 4.0.

Introduction of the acid was then halted and the reaction medium was stirred for 10 min at a temperature of 85° C.

A slurry of precipitated silica was then obtained which was filtered and washed using a filter press to recover a silica cake with a loss on ignition of 81% (and thus a dry matter content of 19% by weight).

This cake was then fluidised by mechanical and chemical action (addition of a quantity of sodium aluminate corresponding to a Al/SiO$_2$ weight ratio of 2700 ppm). After this disintegration operation, a pumpable cake was obtained with a pH of 6.7 which was atmoised using a centrifugal drier.

The characteristics of silica P9 in the form of substantially spherical spherules (in accordance with the invention) were as follows:

| | |
|---|---|
| CTAB specific surface area | 157 m$^2$/g |
| BET specific surface area | 194 m$^2$/g |
| pore volume V1 represented by pores with d ≦ 400 Å | 0.99 cm$^3$/g |
| pore volume V2 represented by pores 175 Å ≦ d ≦ 275 Å | 0.64 cm$^3$/g |
| ratio V2/V1 | 64% |
| average particle size | 260 µm |

The deagglomeration test described above was then carried out on silica P9.

Following ultrasound deagglomeration, the silica had a medial diameter ($\phi_{50}$) of 1.7 µm and an ultrasound deagglomeration factor ($F_D$) of 19 ml.

EXAMPLE 10

The following were introduced into a stainless steel reactor equipped with a propeller stirrer and a double envelope heater:
  733 liters of water and
  46.5 liters of a solution of sodium silicate (SiO$_2$/Na$_2$O molar ratio of 3.5) with a concentration expressed as silica of 235 g/l.

The concentration of silicate expressed as SiO$_2$ in the initial seed was thus 14 g/l. The temperature of the solution was raised to 80° C. with stirring. The entire reaction was carried out at 80° C. and with stirring. A solution of dilute sulphuric acid with a density of 1.050 at 20° C. was then introduced at a rate of 5.4 l/mn for a period of 9 min; following addition, the neutralisation ratio in the seed was 78%, ie., 78% of the quantity of Na$_2$O present in the initial seed had been neutralised.

Simultaneous introduction of a sodium silicate solution of the type described above at a rate of 4.3 l/min and of dilute sulphuric acid also of the type described above and at a rate which was regulated so as to maintain a pH:
  of 8.5±0.1 for the first 55 minutes, then
  of 7.8±0.1 for the final 35 minutes,
in the reaction medium, was then effected over 90 min:

During this simultaneous addition step, the instantaneous neutralisation ratio was 94%, ie., 94% of the quantity of Na$_2$O added (per min) was neutralised.

The consolidation ratio following simultaneous addition was 8.3.

Following simultaneous addition, silicate introduction was halted and dilute sulphuric acid introduction was continued for 6 min to reduce the pH of the reaction medium to a value of 4.2.

Introduction of the acid was then halted and the reaction medium was stirred for 10 min at a temperature of 80° C.

A slurry of precipitated silica was thus obtained which was filtered and washed using a filter press to recover a silica cake with a loss on ignition of 77% (and thus a dry matter content of 23% by weight).

This cake was then fluidised by mechanical and chemical action (addition of a quantity of sodium aluminate corresponding to a Al/SiO$_2$ weight ratio of 3000 ppm plus addition of sulphuric acid). After this disintegration operation, a pumpable cake was obtained with a pH of 6.3 which was atomised using a centrifugal drier.

The characteristics of silica P10 in the form of substantially spherical spherules (in accordance with the invention) were as follows:

| | |
|---|---|
| CTAB specific surface area | 149 m$^2$/g |
| BET specific surface area | 177 m$^2$/g |
| pore volume V1 represented by pores with d ≦ 400 Å | 0.94 cm$^3$/g |
| pore volume V2 represented by pores 175 Å ≦ d ≦ 275 Å | 0.46 cm$^3$/g |
| ratio V2/V1 | 49% |
| average particle size | 240 μm |

The deagglomeration test described above was then carried out on silica P10.

Following ultrasound deagglomeration, the silica had a medial diameter ($\phi_{50}$) of 1.7 μm and an ultrasound deagglomeration factor ($F_D$) of 12 ml.

EXAMPLE 11

The following were introduced into a stainless steel reactor equipped with a propeller stirrer and a double envelope heater:

747 liters of water and 33.2 liters of a solution of sodium silicate ($SiO_2/Na_2O$ molar ratio of 3.5) with a concentration expressed as silica of 235 g/l.

The concentration of silicate expressed as $SiO_2$ in the initial seed was thus 10 g/l. The temperature of the solution was raised to 80° C. with stirring. The entire reaction was carried out at 80° C. with stirring. A solution of dilute sulphuric acid with a density of 1.050 at 20° C. was then introduced at a rate of 5.4 l/mn for a period of 7 min 20 s; following addition, the neutralisation ratio in the seed was 89%, ie., 89% of the quantity of $Na_2O$ present in the initial seed had been neutralised.

Simultaneous introduction of a sodium silicate solution of the type described above at a rate of 4.3 l/min and a dilute sulphuric acid also of the type described above and at a rate which was regulated so as to maintain a pH of 8.5±0.1 for the first 55 minutes, then of 7.8±0.1 for the final 25 minutes in the reaction medium, was then effected over 80 min:

During this simultaneous addition step, the instantaneous neutralisation ratio was 90%, ie., 90% of the quantity of $Na_2O$ added (per min) was neutralised.

The consolidation ratio following simultaneous addition was 10.4.

Following simultaneous addition, silicate introduction was halted and dilute sulphuric acid introduction was continued for 10 min to reduce the pH of the reaction medium to a value of 4.3.

Introduction of the acid was then halted and the reaction medium was stirred for 10 min at a temperature of 80° C.

A slurry of precipitated silica was thus obtained which was filtered and washed using a filter press to recover a silica cake with a loss on ignition of 78.5% (and thus a dry matter content of 21.5% by weight).

This cake was then fluidised by mechanical and chemical action (addition of a quantity of sodium aluminate corresponding to a $Al/SiO_2$ weight ratio of 3000 ppm plus addition of sulphuric acid). After this disintegration operation, a pumpable cake was obtained with a pH of 6.6 which was atomised using a centrifugal drier.

The characteristics of silica P11 in the form of substantially spherical spherules (in accordance with the invention) were as follows:

| | |
|---|---|
| CTAB specific surface area | 172 m$^2$/g |
| BET specific surface area | 205 m$^2$/g |
| pore volume V1 represented by pores with d ≦ 400 Å | 1.00 cm$^3$/g |
| pore volume V2 represented by pores 175 Å ≦ d ≦ 275 Å | 0.57 cm$^3$/g |
| ratio V2/V1 | 57% |
| average particle size | 270 μm |

The deagglomeration test described above was then carried out on silica P11.

following ultrasound deagglomeration, the silica had a medial diameter ($\phi_{50}$) of 2.3 μm and an ultrasound deagglomeration factor ($F_D$) of 18.9 ml.

EXAMPLE 12

For comparison purposes, three silicas with CTAB specific surface areas of between 140 and 240 m$^2$/g, suitable for use as reinforcing fillers for elastomers, were studied. These were:

two commercially available silicas in powder form:
PERKASIL KS 404® (reference PC1 below), sold by AKZO,
ULTRASIL VN3® (reference PC2 below), sold by DEGUSSA, silica (reference MP1 below) in the form of substantially spherical spherules, from Example 12 in European patent application EP-A-0 520 862 (file no 92401677.7).

The characteristics of these silicas are shown in Table I below. For comparison purposes, this Table shows the characteristics of silicas P1 to P11 in accordance with the invention.

TABLE 1

| | PC1 | PC2 | MP1 | P1 | P2 | P3 | P4 | P5 | P6 | P7 | P8 | P9 | P10 | P11 |
|---|---|---|---|---|---|---|---|---|---|---|---|---|---|---|
| $S_{STAR}$ (m$^2$/g) | 145 | 155 | 160 | 159 | 182 | 215 | 210 | 164 | 157 | 168 | 149 | 157 | 149 | 172 |
| $S_{S1}$ (m$^2$/g) | 183 | 170 | 170 | 195 | 225 | 221 | 244 | 194 | 193 | 195 | 200 | 194 | 177 | 205 |
| V1 (cm$^3$/g) | 0.76 | 0.93 | 0.90 | 0.94 | 0.93 | 0.93 | 0.89 | 1.15 | 0.95 | 0.94 | 0.92 | 0.99 | 0.94 | 1.00 |
| V2 (cm$^3$/g) | 0.26 | 0.43 | 0.55 | 0.41 | 0.30 | 0.42 | 0.20 | 0.70 | 0.42 | 0.47 | 0.50 | 0.64 | 0.46 | 0.57 |
| V2/V1 (%) | 34 | 46 | 61 | 44 | 32 | 45 | 20 | 61 | 44 | 50 | 54 | 64 | 49 | 57 |
| Average size (μm) | 12 | 17 | 260 | 60 | 60 | 60 | 60 | 65 | 70 | 65 | 55 | 260 | 240 | 270 |
| $\phi_{50}$ (μm) | 9.45 | 9.9 | 4.3 | 1.2 | 2.9 | 1.2 | 4.1 | 1.2 | 1.3 | 1.1 | 2.3 | 1.7 | 1.7 | 2.3 |
| $F_D$ (ml) | 2.2 | 2.3 | 6.5 | 12 | 14 | 20 | 13 | 12 | 10 | 13 | 17 | 19 | 12 | 13.9 |

EXAMPLE 13

This Example illustrates the use and behaviour of silicas of the invention and of the prior art in an industrial rubber formulation.

The following formulation was used (in parts by weight):

| Rubber SBR 1712[1] | 100 |
|---|---|
| Silica | 51 |
| Active ZnO[2] | 1.81 |
| Stearic acid | 0.35 |
| 6PPD[3] | 1.45 |
| CBS[4] | 1.3 |
| DPG[5] | 1.45 |
| Sulphur[6] | 1.1 |
| Silane X50S[7] | 8.13 |

[1]Styrene butadiene copolymer type 1712
[2]Rubber quality zinc oxide
[3]N-(1,3-dimethylbutyl)-N'-phenyl p-phenylenediamine
[4]N-cyclohexyl 2-benzothiazyl sulphenamide
[5]Diphenyl guanidine
[6]Vulcanising agent
[7]Silica/rubber coupling agent (sold by DEGUSSA)

The formulations were prepared as follows:

The following were introduced into a rubber kneader (BANBURY) in the order shown and at the times and temperatures indicated in brackets:

SBR 1712 ($t_0$) (55° C.)

X50S and ⅔ of the silica ($t_0$+1 min) (90° C.)

ZnO, stearic acid, 6PPD and ⅓ of the silica ($t_0$+2 min) (110° C.)

The kneader was discharged (dumped) when the temperature of the chamber reached 165° C. (ie., at about $t_0$+5 min). The mixture was introduced into a mixing mill at 30° C., for rolling. The CBS, DPG and sulphur were introduced into the mill. After homogenising with three passes, the final mixture was rolled into sheets of 2.5 to 3 mm thickness.

The test results were as follows:

1. Rheological Properties

Measurements were carried out on uncured formulations.

The results are shown in Table II below. The apparatus used to carry out the measurements is indicated.

TABLE II

| | P5 | P6 | P7 | PC1 | PC2 | MP1 |
|---|---|---|---|---|---|---|
| MOONEY Consistency (1) | 100 | 93 | 98 | 123 | 138 | 112 |
| Min. couple (2) | 19.0 | 18.5 | 18.7 | 28.0 | 32.2 | 20.5 |

(1) MOONEY MV 200E viscosimeter (Mooney Large (1 + 4) measurement)
(2) MONSANTO 100S flow meter The formulations obtained from the silicas of the invention produced lower values.

This translates as easier use of the mixtures prepared from the silicas of the invention, in particular regarding extrusion and rolling operations which are frequently carried out during tire manufacture (lower energy outlay for mixing, greater ease of injection during mixing, reduced expansion in the die during extrusion, less shrinkage during rolling . . . ).

2. Mechanical Properties

The measurements were carried out on vulcanised formulations. Vulcanisation was carried out by raising the formulations to a temperature of 150° C. for 40 minutes.

The following standards were used:

(i) Tensile tests (modules, rupture resistance) NFT 46-002 or ISO 37-1977

(ii) Tear resistance tests DIN 53-507

(iii) Abrasion resistance tests DIN 53-516

The results obtained are shown in Tables III and IV below.

TABLE III

| | P5 | P6 | P7 | PC1 | PC2 | MP1 |
|---|---|---|---|---|---|---|
| 100% modulus (MPa) | 2.3 | 1.9 | 1.7 | 2.9 | 3.3 | 1.9 |
| 300% modulus (MPa) | 11.1 | 10.3 | 8.5 | 11.7 | 12.2 | 8.3 |
| Reinforcing index[1] | 4.8 | 5.4 | 4.9 | 4.0 | 3.7 | 4.4 |
| Rupture resistance (MPa) | 26.4 | 24.5 | 26.0 | 21.1 | 20.9 | 24.4 |
| Tear resistance (kN/m) | 21.0 | 22.5 | 21.0 | 13.7 | 14.0 | 20.0 |

[1]corresponds to the ratio: 300% module/100% module

These latter results show an overall improvement in the reinforcing effect conferred by the silicas of the invention with respect to prior art silicas with an equivalent theoretical reinforcing power.

The silicas of the invention produce reinforcing indices which are higher than those obtained with prior art silicas, ie., a very satisfactory compromise between the 100% module and the 300% module; the silicas of the invention produce fairly low 100% modules, indicating good silica dispersion, and relatively high 300% modules, indicating a high silica/rubber interaction density; while the P7 silica of the invention had a lower 300% module, at the same time it had an extremely low 100% module.

The higher reinforcing power of the silicas of the invention was also confirmed by the higher values obtained for rupture and tear resistance.

TABLE IV

| | P5 | P6 | P7 | PC1 | PC2 | MP1 |
|---|---|---|---|---|---|---|
| Abrasion resistance ($mm^3$)[1] | 66 | 60 | 65 | 83 | 83 | 75 |

[1]The value measured is the abrasion loss: the lower the value, the better the abrasion resistance.

Regarding abrasion resistance, it can be seen that the abrasion loss is reduced by 10% to more than 20% with respect the comparison silicas. This is an important advantage in tire applications.

3. Dynamic Properties

The measurements were carried out on vulcanised formulations.

Vulcanisation was effected by raising the temperature of the formulation to 150° C. for 40 minutes.

The results are shown in Table V below. The apparatus used to carry out the measurements is indicated.

TABLE V

| | P5 | P6 | P7 | PC1 | PC2 | MP1 |
|---|---|---|---|---|---|---|
| GOODRICH temperature (° C.)[1] | 81 | 80 | 80 | 81 | 86 | 85 |

[1]GOODRICH flexometer

The temperature obtained using silicas in accordance with the invention was relatively low.

EXAMPLE 14

This Example illustrates the use and behaviour of silicas of the invention and a prior art silica in an industrial rubber formulation.

The following formulation was used (in parts by weight):

| | |
|---|---|
| Tufdene 2330 Rubber | 75 |
| BR 1220 Rubber[(1)] | 25 |
| Silica | 51 |
| Active ZnO[(2)] | 1.81 |
| Stearic acid | 1.1 |
| 6PPD[(3)] | 1.45 |
| CBS[(4)] | 1.3 |
| DPG[(5)] | 1.45 |
| Sulphur[(6)] | 1.1 |
| Silane X50S[(7)] | 8.13 |

[(1)]Butadiene polymer 1220 rubber
[(2)]Rubber quality zinc oxide
[(3)]N-(1,3-dimethylbutyl)-N'-phenyl p-phenylenediamine
[(4)]N-cyclohexyl 2-benzothiazyl sulphenamide
[(5)]Diphenyl guanidine
[(6)]Vulcanising agent
[(7)]Silica/rubber coupling agent (sold by DEGUSSA)

The formulations were prepared as follows:

The following were introduced into a rubber kneader (BANBURY) in the order shown and at the times and temperatures indicated in brackets:

Tufdene 2330 and BR 1220 ($t_0$) (55° C.)

X50S and ⅔ of the silica ($t_0$+1 min) (90° C.)

ZnO, stearic acid, 6PPD and ⅓ of the silica ($t_0$+2 min) (110° C.)

The kneader was discharged (dumped) when the temperature of the chamber reached 165° C. (ie., at about $t_0$+5 min). The mixture was introduced into a mixing mill at 30° C., for rolling. The CBS, DPG and sulphur were introduced into the mill.

After homogenising with three passes, the final mixture was rolled into sheets of 2.5 to 3 mm thickness.

Test results were as follows:

1. Rheological Properties

Measurements were carried out on uncured formulations.

The results are shown in Table VI below. The apparatus used to carry out the measurements is indicated.

TABLE VI

| | P9 | P10 | PC2 |
|---|---|---|---|
| MOONEY Consistency[(1)] | 115 | 109 | 132 |
| Min couple[(2)] | 26.1 | 24.5 | 31.1 |

[(1)]MOONEY MV 200E viscosimeter (Mooney Large (1 + 4) measurement)
[(2)]MONSANTO 100S flow meter The formulations obtained from the silicas of the invention produced lower values.

This translates as easier use of the mixtures prepared from the silicas of the invention, in particular regarding extrusion and rolling operations which are frequently carried out during tire manufacture (lower energy outlay for mixing, greater ease of injection during mixing, reduced expansion in the die during extrusion, less shrinkage during rolling . . . ).

2. Mechanical Properties

The measurements were carried out on vulcanised formulations.

Vulcanisation was carried out by raising the formulations to a temperature of 150° C. for 40 minutes.

The following standards were used:

(i) Tensile tests (modules, rupture resistance) NFT 46-002 or ISO 37-1977 (DIN 53 504)

(ii) Tear resistance tests NFT 46-007

(iii) Abrasion resistance tests DIN 53-516

The results obtained are shown in Tables VII and VIII below.

TABLE VII

| | P9 | P10 | PC2 |
|---|---|---|---|
| 100% modulus (MPa) | 2.6 | 2.8 | 3.1 |
| 300% modulus (MPa) | 11.4 | 13.1 | 11.1 |
| Reinforcing index[(1)] | 4.4 | 4.7 | 3.6 |
| Rupture resistance (MPa) | 19.4 | 19.7 | 17.1 |
| Tear resistance (kN/m) | 37.8 | 39.7 | 33.0 |

[(1)]corresponds to the ratio: 300% module/100% module

These latter results show an overall improvement in the reinforcing effect conferred by the silicas of the invention with respect to prior art silicas with an equivalent theoretical reinforcing power.

The silicas of the invention produce reinforcing indices which are higher than those obtained with prior art silicas, ie., a very satisfactory comprise between the 100% module and the 300% module; the silicas of the invention produce fairly low 100% modules, indicating good silica dispersion, and relatively high 300% modules, indicating a high silica/rubber interactions density.

The higher reinforcing power of the silicas of the invention was also confirmed by the higher values obtained for rupture and tear resistance.

TABLE VIII

| | P9 | P10 | PC2 |
|---|---|---|---|
| Abrasion resistance ($mm^3$)[(1)] | 56 | 59 | 63 |

[(1)]The value measured is the abrasion loss: the lower the value, the better the abrasion resistance.

Regarding abrasion resistance, it can be seen that the abrasion loss is reduced by about 10% with respect to the comparison silicas. This is an important advantage in tire applications.

What is claimed is:

1. Precipitated silica particulates suited for disintegration and homogeneous incorporation, dispersion and distribution within vulcanized elastomeric matrices reinforced therewith, said precipitated silica particulates comprising a powder having a CTAB specific surface ranging from 140 to 240 $m^2/g$, a median diameter factor $\phi_{50}$, after ultrasonic disintegration, less than 5 μm, exhibiting an ultrasonic disintegration factor $F_D$ greater than 5.5 ml, having a BET specific surface ranging from 140 to 300 $m^2/g$, having a mean particle size of at least 15 μm, a loose packing density of at least 0.17, a total pore volume of at least 2.5 $cm^3/g$, a pore volume distribution such that the volume of pores having diameters ranging from 175 Å to 275 Å is less than 49% of the volumes of pores having diameters less than or equal to 400 Å and a DOP oil uptake ranging from 150 to 400 ml/100 g.

2. The precipitated silica of claim 1, wherein the mean particle size of the powder is between 15 μm and 60 μm.

3. The precipitated silica of claim 2, wherein the mean particle size of the powder is between 20 μm and 45 μm.

4. Precipitated silica particulates suited for disintegration and homogeneous incorporation, dispersion and distribution within vulcanized elastomeric matrices reinforced therewith, said precipitated silica particulates comprising substantially spherical beads having a CTAB specific surface ranging from 140 to 240 $m^2/g$, a median diameter $\phi_{50}$, after ultrasonic disintegration, less than 5 μm, exhibiting an ultrasonic disintegration factor $F_D$ greater than 5.5 ml, having a BET specific surface ranging from 140 to 300 m²/g, having a mean particle size of at least 80 µm, a loose packing density of at least 0.17, a total pore volume of at least 2.5 cm³/g, a pore volume distribution such that the volume of pores having diameters ranging from 175 Å to 275 Å is less than 49% of the volume of pores having diameters less than or equal to 400 Å and a DOP oil uptake ranging from 150 to 400 ml/100 g.

5. The precipitated silica of claim 4, wherein the mean particle size of the spherical beads is between 100 µm and 300 µm.

6. The precipitated silica of claim 5, wherein the mean particle size of the spherical beads is between 100 µm and 270 µm.

7. Precipitated silica particulates suited for disintegration and homogeneous incorporation, dispersion and distribution within vulcanized elastomeric matrices reinforced therewith, said precipitated silica particulates comprising granulates having a CTAB specific surface ranging from 140 to 240 m²/g, a median diameter $\phi_{50}$, after ultrasonic disintegration, less than 5 µm, exhibiting an ultrasonic disintegration factor $F_D$ greater than 5.5 ml, having a BET specific surface ranging from 140 to 300 m²/g, having a dimension of at least 1 mm along the longest axis thereof, a total pore volume of at least 1 cm³/g, a pore volume distribution such that the volume of pores having diameters ranging from 175 Å to 275 Å is less than 49% of the volumes of pores having diameters less than or equal to 400 Å and a DOP oil uptake ranging from 150 to 400 ml/100 g.

8. The precipitated silica of claim 7, wherein the dimension of the granulates along the longest axis thereof is between 1 mm and 10 mm.

9. A vulcanized elastomeric matrix having a reinforcing filler material homogeneously dispersed and distributed therethrough, said reinforcing filler material comprising finely divided precipitated silica particulates and said precipitated silica particulates deriving from a powder having a CTAB specific surface ranging from 140 to 240 m²/g, a median diameter $\phi_{50}$, after ultrasonic disintegration, less than 5 µm, exhibiting an ultrasonic disintegration factor $F_D$ greater than 5.5 ml, having a BET specific surface ranging from 140 to 300 m²/g, having a mean particle size of at least 15 µm, a loose packing density of at least 0.17, a total pore volume of at least 2.5 cm³/g, a pore volume distribution such that the volume of pores having diameters ranging from 175 Å to 275 Å is less than 49% of the volumes of pores having diameters less than or equal to 400 Å and a DOP oil uptake ranging from 150 to 400 ml/100 g.

10. A vulcanized elastomeric matrix having a reinforcing filler material homogeneously dispersed and distributed therethrough, said reinforcing filler material comprising finely divided precipitated silica particulates and said precipitated silica particulates deriving from substantially spherical beads having a CTAB specific surface ranging from 140 to 240 m²/g, a median diameter $\phi_{50}$, after ultrasonic disintegration, less than 5 µm, exhibiting an ultrasonic disintegration factor $F_D$ greater than 5.5 ml, having a BET specific surface ranging from 140 to 300 m²/g, having a mean particle size of at least 80 µm, a loose packing density of at least 0.17, a total pore volume of at least 2.5 cm³/g, a pore volume distribution such that the volume of pores having diameters ranging from 175 Å to 275 Å is less than 49% of the volume of pores having diameters less than or equal to 400 Å and a DOP oil uptake ranging from 150 to 400 ml/100 g.

11. A vulcanized elastomeric matrix having a reinforcing filler material homogeneously dispersed and distributed therethrough, said reinforcing filler material comprising finely divided precipitated silica particulates and said precipitated silica particulates deriving from granulates having a CTAB specific surface ranging from 140 to 240 m²/g, a median diameter $\phi_{50}$, after ultrasonic disintegration, less than 5 µm, exhibiting an ultrasonic disintegration factor $F_D$ greater than 5.5 ml, having a BET specific surface ranging from 140 to 300 m²/g, having a dimension of at least 1 mm along the longest axis thereof, a total pore volume of at least 1 cm³/g, a pore volume distribution such that the volume of pores having diameters ranging from 175 Å to 275 Å is less than 49% of the volumes of pores having diameters less than or equal to 400 Å and a DOP oil uptake ranging from 150 to 400 ml/100 g.

* * * * *